United States Patent
Orellana

(10) Patent No.: US 11,216,669 B1
(45) Date of Patent: Jan. 4, 2022

(54) SINGLE FRAME MOTION DETECTION AND THREE-DIMENSIONAL IMAGING USING FREE SPACE INFORMATION

(71) Applicant: Outsight SA, Paris (FR)

(72) Inventor: Raul Bravo Orellana, Paris (FR)

(73) Assignee: Outsight SA, Paris (FR)

( * ) Notice: Subject to any disclaimer, the term of this patent is extended or adjusted under 35 U.S.C. 154(b) by 0 days.

(21) Appl. No.: 16/745,221

(22) Filed: Jan. 16, 2020

(51) Int. Cl.
| | |
|---|---|
| G06K 9/00 | (2006.01) |
| G01S 17/931 | (2020.01) |
| B60R 25/01 | (2013.01) |
| G01S 17/58 | (2006.01) |
| G01S 17/04 | (2020.01) |
| B60R 25/10 | (2013.01) |

(52) U.S. Cl.
CPC .......... *G06K 9/00771* (2013.01); *B60R 25/01* (2013.01); *B60R 25/1004* (2013.01); *G01S 17/04* (2020.01); *G01S 17/58* (2013.01); *G01S 17/931* (2020.01); *G06K 9/00208* (2013.01); *G06K 9/00798* (2013.01); *G06K 9/00812* (2013.01)

(58) Field of Classification Search
None
See application file for complete search history.

(56) References Cited

U.S. PATENT DOCUMENTS

| | | | | |
|---|---|---|---|---|
| 6,049,619 | A * | 4/2000 | Anandan | G06K 9/209 382/107 |
| 8,744,744 | B2 * | 6/2014 | Takagi | G01S 13/931 701/301 |
| 10,380,799 | B2 * | 8/2019 | Arsan | G06T 19/006 |
| 2003/0025694 | A1 * | 2/2003 | Davis | G06T 15/20 345/419 |
| 2014/0376775 | A1 * | 12/2014 | Datta | H04N 13/264 382/103 |
| 2015/0035822 | A1 * | 2/2015 | Arsan | G06T 19/006 345/419 |
| 2015/0379768 | A1 * | 12/2015 | Datta | G06T 3/40 382/197 |
| 2016/0335798 | A1 * | 11/2016 | Datta | G06T 7/251 |
| 2018/0165816 | A1 * | 6/2018 | Bellis | G06T 7/20 |
| 2018/0165916 | A1 * | 6/2018 | Marantelli | G06Q 30/06 |
| 2018/0275252 | A1 * | 9/2018 | Fried | G01S 17/66 |

(Continued)

FOREIGN PATENT DOCUMENTS

EP 3261071 A1 * 12/2017 ............. G08B 29/04

*Primary Examiner* — Anand P Bhatnagar

(57) ABSTRACT

The invention belongs to motion detection and three-dimensional image analysis technology fields. It can be applied to movement detection or intrusion detection in the surveillance of monitored volumes or monitored spaces. It can also be applied to obstacle detection or obstacle avoidance for self-driving, semi-autonomous vehicles, safety systems and ADAS. A three-dimensional imaging system stores 3D surface points and free space locations calculated from line of sight data. The 3D surface points typically represent reflective surfaces detected by a sensor such as a LiDAR, a radar, a depth sensor or stereoscopic cameras. By using free space information, the system can unambiguously derive a movement or an intrusion the first time a surface is detected at a particular coordinate. Motion detection can be performed using a single frame or a single 3D point that was previously a free space location.

25 Claims, 7 Drawing Sheets

(56) References Cited

U.S. PATENT DOCUMENTS

| | | | | |
|---|---|---|---|---|
| 2019/0361101 A1* | 11/2019 | Piatek | ................... | G01S 17/931 |
| 2020/0074233 A1* | 3/2020 | Englard | ............... | G06K 9/6256 |
| 2020/0175844 A1* | 6/2020 | Bravo Orellana | ........................... | |
| | | | | G08B 13/19608 |

* cited by examiner

SINGLE FRAME MOTION DETECTION AND THREE-DIMENSIONAL IMAGING USING FREE SPACE INFORMATION

FIELD OF THE INVENTION

The present invention relates to motion detection and three-dimensional image analysis. More particularly, the present invention is related to a system and method for performing movement and intrusion detection via the surveillance of monitored volumes and spaces using free space information.

BACKGROUND OF THE INVENTION

Three-dimensional (3D) imaging systems typically characterize the physical environment around them using point cloud data gathered from spatial sensors such as Lidar. The point cloud data may be stored in a surface point database and the surface point database can be used to track larger objects within the surrounding environment.

The 3D imaging system may also try to track changes in the physical environment. These changes may arise from the motion of the imaging system itself or from the motion of the surrounding objects. If the 3D imaging system is part of a moving system such as an autonomous vehicle, the system may adjust its path of travel in response to detected motion. Alternatively, the system may send out an alert or message so that someone, or something, can determine the proper response to the motion.

A conventional 3D imaging system typically detects movements or intrusions by measuring a plurality of 3D points over multiple frames, or within a close vicinity of an object, to ensure a reliable detection. For example, the patent publication U.S. Pat. No. 9,915,733B2 (Massachusetts Institute of Technology) entitled "Methods and apparatus for three-dimensional (3D) imaging" describes a system for generating a 3D image of the scene based on the multiple 3D representations captured with a Lidar.

Similarly, the patent publication U.S. Pat. No. 9,110,163B2 entitled "Lidar-based classification of object movement" describes a technique for detecting a movement with multiple Lidar frames. Additionally, the patent publication entitled U.S. Pat. No. 9,858,640B1 entitled "Device and method for merging 3D point clouds from sparsely distributed viewpoints" describes a registration method for merging point cloud data from multiple viewpoints. This leverages geometric transformation to register the point cloud. This technique is part of the general category of simultaneous localization and mapping (SLAM) algorithms.

All these techniques use multiple frames of data to detect movement or intrusions. The use of multiple frames of data can increase cost and reduce the responsiveness of the 3D imaging system. This, in turn, reduces the suitability of these 3D imaging systems for mass market applications and/or for rapidly changing environments. To make things worse, in real time applications 3D imaging systems such as Lidar typically only provide sparse information as there is a need to cover a wide field of view with a limited duration per frame. Thus, the quality of the information provided by a typical 3D imaging system is often compromised by the configuration of the computer architecture and storage and manipulation of the information contained therein.

Thus, there is a need for an improved method and apparatus for performing 3D imaging and motion detection.

SUMMARY OF THE INVENTION

The present invention includes a 3D imaging system that stores 3D surface points from point cloud data as well as free space information calculated from line of sight vectors. The point cloud data may be generated by sensor systems such as Lidar. The 3D surface points typically represent reflective surfaces detected by that sensor. The free space information is preferably one or more free space locations determined by calculating a line of sight vector between a sensor and one of the reflective surface points (3D point) in the point cloud data.

The invention can be applied to movement detection or intrusion detection. In some embodiments, motion detection can be performed using a single frame or a single 3D point. For instance, by using free space information stored in a free space cloud database the system can unambiguously derive a movement or an intrusion the first time a surface is detected at a particular coordinate. In other words, by identifying a single 3D point in a single frame that was previously a free space location, it is possible to conclude that there is a movement or an intrusion in that particular 3D point.

In another embodiment of the invention, it is possible to further increase the resolution of the 3D imaging system by projecting past frames onto a fixed frame, where the relative motion of the 3D imaging system is corrected in that fixed frame. The system may aggregate point cloud data and/or free space information over multiple frames. One benefit of this system of data storage is that the free space tends to be stable frame over multiple frames (most of the space is free in the field of view), which reduces memory access.

Another embodiment of the invention includes a method for detecting movement from 3D point cloud data received from one or more 3D sensors. The point cloud data includes 3D points corresponding to surfaces detected in a physical space. Free space locations are then identified as points located in a line of sight between the 3D surface points and the location of one or more sensors in the 3D imaging system. When an occupied space location is detected at a location that was previously free space, a movement or intrusion is defined for that new occupied space location. In some embodiments of the invention, if the occupied space location is within a free space zone (or "voxel") the entire free space zone may be set to occupied space and/or removed from the free space database. The free space zones (voxels) may be prism or column shaped volumes that are placed in zones of interest for faster processing of the point cloud data being received.

Another embodiment of the invention includes an apparatus for monitoring the environment surrounding a system. In this embodiment, a sensor scans physical surfaces and generates 3D points that correspond to the location of physical surfaces. The 3D points may be delivered in the form of 3D point cloud data. The sensor includes one or more receptors and the apparatus may generate a signal such as a radio or audio signal or laser pulse. The apparatus uses a processing unit such as a microprocessor to calculate free space points based on the 3D points received from the sensor. The free space points are preferably calculated by identifying a line of sight between a 3D point and the location of a receiver with the sensor. This is followed by having one or more points in this line of sight set to free space locations. The apparatus further includes a memory for storing the 3D points as well as the free space locations. Additionally, the memory may include machine readable instructions for controlling the operation of the processing unit.

In still another embodiment of the invention a zone of interest is established. The zone of interest may be, for example, a section of road just ahead of the 3D imaging system. In accordance with this embodiment the zone of interest is updated more frequently than other zones. This updating may be performed in a sliding window approach where overlapping sections of this zone of interest are scanned and processed with greater regularity. Each scan will include a section that is common with the previous zone of interest as well as a new section of interest as the system moves in a known direction. This overlapping may also extend to the storage of the 3D surface point and free space locations in memory. That is, the data points may be stored into overlapping sections of the memory unit of the 3D imaging system in certain embodiments of the invention.

One aspect of the invention includes a movement detection method comprising the step of receiving a first 3D point corresponding to a detection by a first 3D sensor of a first occupied location at a first time of detection in a physical space. It also comprises the step of receiving a second 3D point corresponding to a detection of a second occupied location at a second time of detection, the first time of detection being different from the second time of detection. Finally, the method includes the steps of determining a third 3D point in a line-of-sight between the first 3D sensor at the first time of detection and the first 3D point and detecting a movement at the third 3D point if the second 3D point and the third 3D point have functionally equivalent 3D coordinates.

Another aspect of the invention includes a detection system comprising a 3D sensor for scanning a physical environment and for generating 3D points corresponding to physical surfaces in the physical environment. It also comprises one or more non-transitory computer readable media for storing instructions to generate free space points using a first receiver location from the 3D sensor and a 3D point from the 3D points, store the 3D points and the free space points, and generate an intrusion event when 3D coordinates for a 3D point corresponds to 3D coordinates for a free space point.

Still another aspect of the invention includes a method for performing movement detection comprising the steps of receiving first 3D point cloud data from one or more 3D sensors, the first 3D point cloud data having 3D points corresponding to occupied space locations in a physical space, calculating a line of sight between a first 3D point from the first 3D point cloud data and a position of a sensor from the one or more 3D sensors, determining a free space 3D point that falls along the line of sight, receiving second 3D point cloud data from the one or more 3D sensors, determining a new occupied 3D point from the second 3D point cloud data, determining that the new occupied 3D point is equivalent to the free space 3D point and detecting movement in response to determining that the free space point is now occupied. In some embodiments of the invention a quality metric is applied to the 3D point or free space locations and the various determinations described throughout this application may use this quality information.

DETAILED DESCRIPTION OF THE INVENTION

Figure 1:
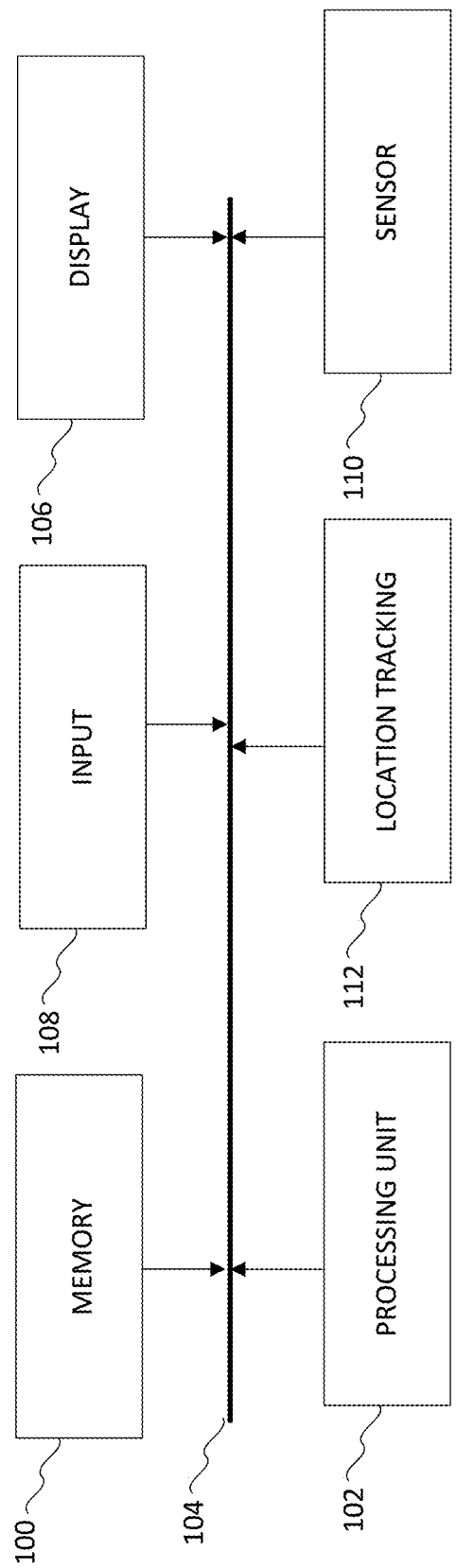
FIG. 1 is a block diagram of a 3D imaging system.

FIG. 1 is a block diagram of a 3D imaging system configured in accordance with one embodiment of the invention. The system includes memory 100, processing unit 102, interconnect 104, display 106, input 108 and sensor 110. Memory 100 contains data and instructions that are used by processing unit 102. These data and instruction cause processing unit 102 to receive image data from sensor 110 and display information on display 106. Additionally, processing unit 102 may receive user input from input 108.

In general, the various steps and operations described herein are performed by processing unit 102 which receives instructions stored in memory 100. Processing unit 102 controls the various other blocks in response to the instructions from memory unit 100 as well as in response to data received from other blocks shown FIG. 1.

Memory 100 is typically a combination of semiconductor-based static and dynamic RAM working in conjunction flash-RAM and hard disk drive storage systems, or some subset thereof. Processing unit 102 is preferably a semiconductor-based microprocessor unit. Input 108 may be a keyboard, selection knob, joystick, or touch screen. Display 106 is typically a flat screen display such as an LCD or OLED display. In some embodiments of the invention input 108 and display 106 may be integrated into a single touchscreen display. Interconnect 104 may be a parallel computer bus, USB, SATA, PATA, ethernet or some combination thereof.

Sensor 110 may be various types of scanning devices including radio frequency, infrared, optical or ultra violet sensing semiconductor device or component. Sensor 110 may also be a sound sensing device such as a microphone. In various embodiments of the invention the sensors may be time-of-flight 3D scanners or more generally depth-resolved imaging systems such as Lidar. In still other embodiments of the invention, sensor 110 may be sets of sensors that provides sets of image information that can be used to perform geometric transformations to derive 3D information from a set of 2D images, such as stereoscopic 3D cameras. Sensor 110 may generate light, radio frequency signal or sound to enable the detection of the reflection of these signals from object surfaces, or it may use signals naturally present in the environment such as light from outside sources.

Alternative embodiments of the invention may place one or more of the components (or portions therefore) shown in FIG. 1 in remote locations. In this configuration the remotely located components would be accessed via network connections. For example, portions of memory 110 may be cloud based storage with topographical information including the location of buildings and other structures that is accessed via the Internet.

During exemplary operation of the 3D imaging system sensor 110 generates 3D point cloud data in response to scans performed on the surrounding area. The point cloud data includes a set of 3D surface points (also referred to as just 3D points.) The point cloud data may also be in the form of points of geometric samples on the surface of the subject objects. Alternatively, the 3D points may take the form of a distance measurements to directly acquire 3D information. The point cloud data is used to update an object database. The object database is stored in memory 100. The object database contains objects that represent the physical environment surrounding the 3D imaging system.

The point cloud data is delivered to the other systems for further processing. This processing includes the determination of free space locations based on the 3D points. The free space locations are preferably determined by calculating a line of sight between a 3D point and the location of sensor 110 or the location of a receptor associated with sensor 110. Points along that line of sight are then designated as free space locations. The free space locations are preferably stored in a free space location database. Alternatively, the free space location and the 3D points may be stored in the same database as the 3D points. As described in greater detail below, when a 3D point matches a free space location an intrusion event is created. The intrusion event may be used by 3D imaging system in various ways, including changing speed or direction or sending out a message or alert.

In some embodiments of the invention a free space status for given location is derived from free space information in a 3D geometric reference map. In this embodiment, the 3D geometric reference map includes the locations of the various objects that have been previously detected by sensor 110. Additionally, objects that are known, or that have been reported by other systems that share object location data, may also be stored in the 3D geometric reference map. The position, pose, configuration or motion of the object 3D imaging system itself may be stored within the reference map as well.

Figure 2A:
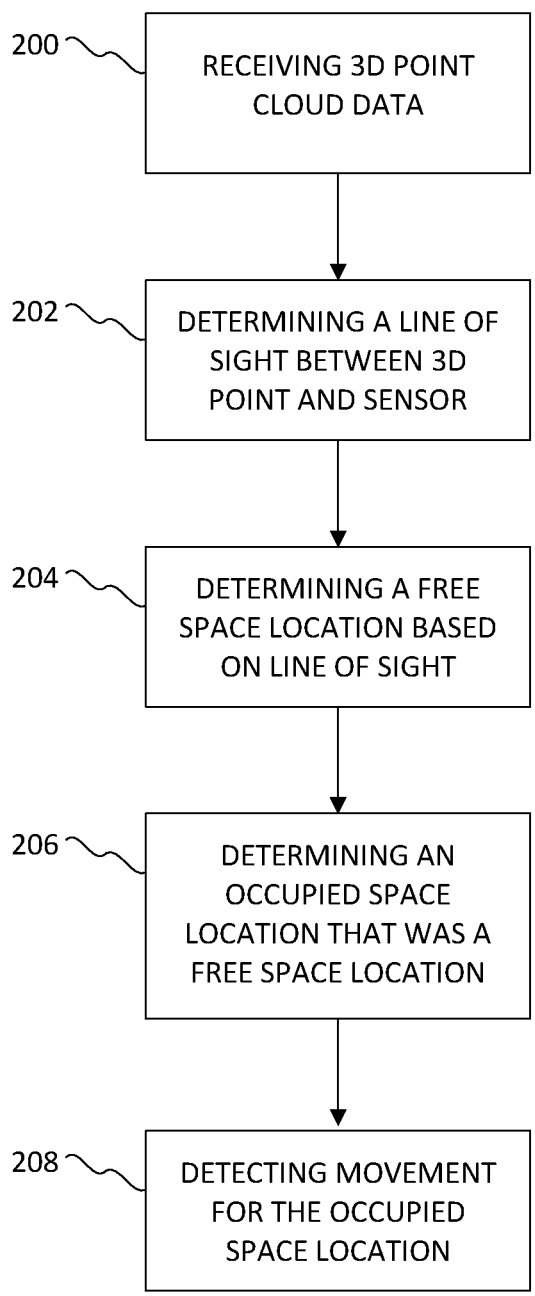
FIG. 2A is a flow chart illustrating the operation of a 3D imaging system.

FIG. 2A is a flow chart illustrating the steps performed in accordance with one embodiment of the invention. The process begins at step 200 when 3D point cloud data is received. The 3D point cloud data is preferably generated by a sensor and it may include 3D point (3D coordinate) information as well as time information. At step 202 a line of sight between a 3D point and a sensor location is determined. The line of sight should include a set of points that fall along that line of sight. At step 204 a set of points associated with the line of sight are designated as free space locations. These free space locations may be stored in a free space location database or alternatively in the same database as the 3D points. At step 206 it is determined that a 3D point that is now occupied was previously a free space location. At step 208 movement is detected for this 3D point and/or the associated coordinate.

The invention can be applied to stereoscopic imaging systems. In a stereoscopic imaging system there are two lines of sights per point. A point that appears in left and right image is therefore in direct line of sight for both the left and the right sensor. In this embodiment the distance may be calculated via geometric principles such as triangulation and voxels along both paths may be given a free space designation, although other methods of calculation are consistent with other embodiments of the invention.

The free space data can be stored and encoded by various techniques that enhance the operation of the 3D imaging system. In one embodiment the free space data is comprised of an explicit free space voxel list. Alternatively, free space information is encoded by deleting occupied voxels from a finite occupied voxel list, the occupied voxel list being initialized with a space filled with occupied voxels. Over time, free space data is encoded by removing voxels and the absence of a voxel from the list being indicative of a free space in that missing voxel. The free voxels can be of any shape: voxel cubes or cuboids, voxel 3D triangles or pyramids, voxel polygons, spherical voxels or cone sections for instance. A particularly advantageous use of prism shaped voxels is described below with reference to FIGS. 4C and 4D. Free space information can also be stored using a continuous (or soft) value that encodes for a probability of free space, rather than a free space or occupied binary value. As described herein, the free space probability can then be compared to a detection threshold where a value about the threshold means occupied space and a value below the threshold means free space.

Figure 2B:
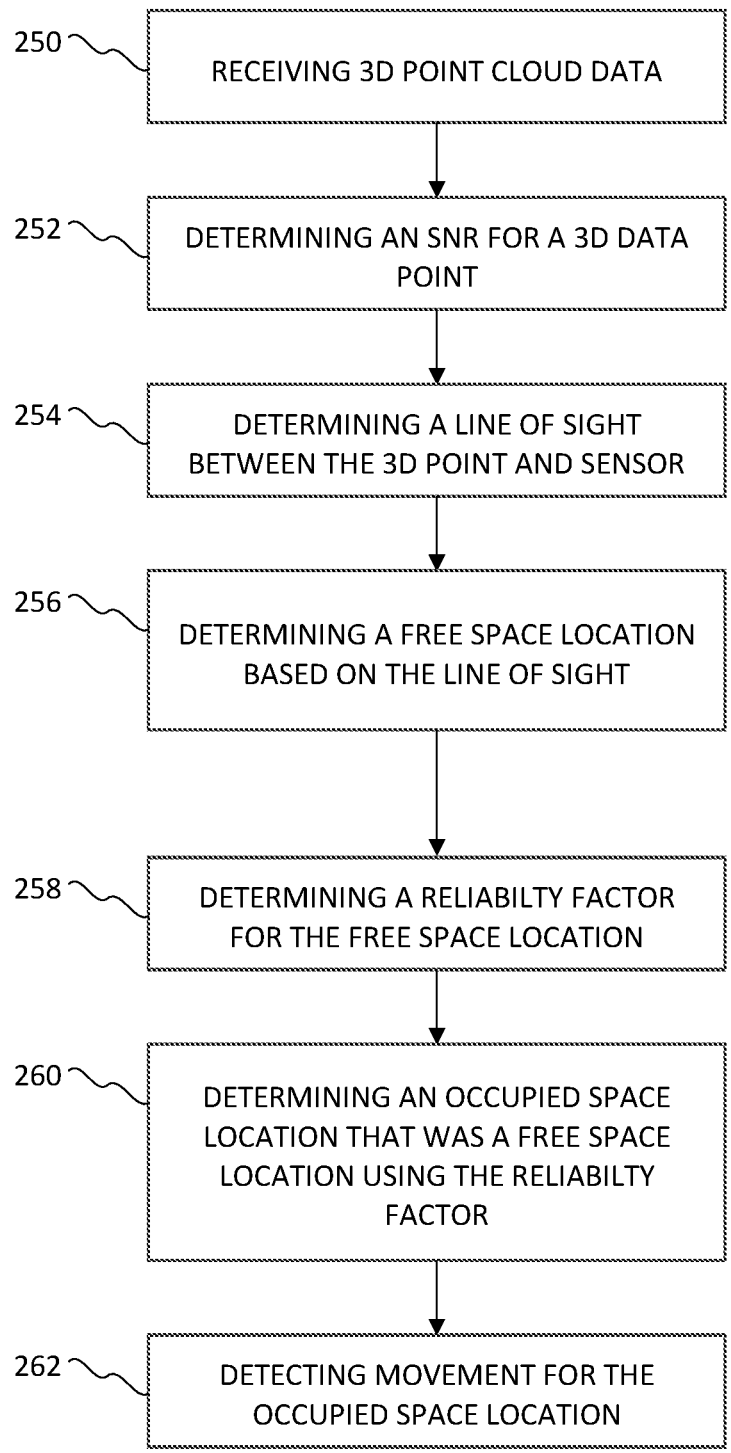
FIG. 2B is a flow chart illustrating the operation of a 3D imaging system.

FIG. 2B is a flow chart illustrating the operation of a 3D imaging system in accordance with an alternative embodiment of the invention. At step 250 3D point cloud data from a sensor is received. At step 252 a signal to noise ratio (SNR) is determined for a 3D point from the 3D point cloud data. The SNR may be separate information within the 3D point cloud data, or it may be calculated from the intensities of the 3D point itself (or a set of 3D points.) Alternatively, the determination of the SNR does not have to come from a measurement. The SNR may be set based on environmental conditions such as the weather (rain, fog, etc.), whether it is day or night or other external factors. The SNR may also be set via user input. Those skilled in the art will recognize other ways to determine an SNR value from point cloud data. Those skilled in the art will also recognize that SNR is just one measure of the quality of the 3D point cloud data and that the use of other quality or reliability metrics is consistent with other embodiments of this invention. The threshold against which the SNR is compared may also be adjusted based on environmental factors or user input.

At step 254 a line of sight is determined between the 3D point and the sensor. At step 256 a free space location is determined based on the line of sight. This preferably entails setting a point along the line of sight to a free space location. In some embodiments of the invention, the determination that a point is a free space location is only made if the associated 3D point has a reliability that exceeds a certain threshold. That is, if the SNR of a 3D point is too low then the points associated with the line of sight for that 3D point will not be set to free space locations. This will reduce the number of false positives detected. At step 258 a reliability factor is determined for the free space location. The reliability factor will typically depend on the SNR of the associated 3D point.

At step 260 it is determined that the 3D point from the 3D point cloud data was previously a free space location. This determination is performed using the reliability of 3D point. In particular, if the reliability of the 3D point exceeds a threshold then a determination that the free space is now occupied will be made. If the reliability of the 3D point falls below the threshold then no determination that the free space is occupied with be made. The threshold may be adjusted based on the requirements of application being performed. For example, for a moving vehicle the threshold might be set to a very low value as false detections are preferred over missed detections. For a security monitoring application, however, the threshold may be set higher as false positives may precipitate physical investigations or responses, which are costly.

Figure 3:
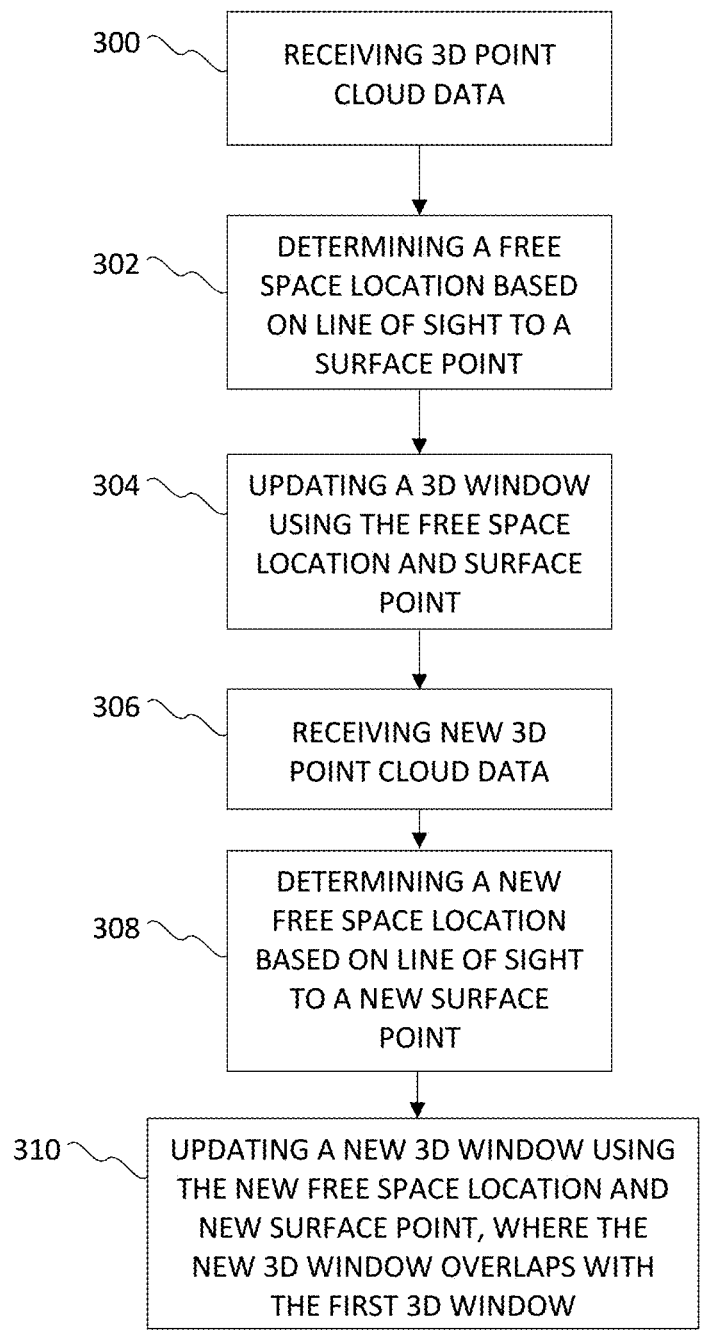
FIG. 3 is a flow chart illustrating the operation of a 3D imaging system.

FIG. 3 is a flow chart illustrating the operation of a 3D imaging system in accordance with another embodiment of the invention. The process begins at step 300 when the system receives 3D point cloud data. At step 302 a first free space location is determined based on a line of sight to a 3D point (surface point.) At step 304 a window of 3D points is updated based on the free space point and the 3D point. The window maybe a section of the environment around the imaging system that is of particular interest such as the road in front of a moving vehicle.

At step 306 a new 3D point cloud data is received. At step 308 a new free space location is determined based on a line of sight to a new 3D point. At step 310 a new window is updated based on the new free space location as well as the new 3D point. The new window preferably overlaps the first window. That is, the new window includes a section that is common with first window as well as a section that is not included in the first window. Additionally, the new window lacks a section that is in the first window. This creates an overlap that can assist in the monitoring zones of particular interest.

In some embodiments of the invention updates of the overlapping windows can correspond to actual memory spaces within memory unit 100. For example, the data associated with the sliding window may be stored in a higher speed, or higher bandwidth, memory section such as SRAM or cache ram. This assists with memory access while also allowing for high interest zones to be monitored with higher frequency.

FIGS. 4A through 4D illustrate use of one embodiment of the invention in a non-static environment. In this configuration the 3D imaging system is located within automobile 400. A sensor within automobile 400 detects 3D surface point 410 on the trunk of tree 404. The sensor may be a Lidar system or a light sensitive camera, or it may be one of the other types of sensors described herein. Based on 3D surface point 410 the 3D imaging system calculates line of sight 402 between the 3D surface point 410 and the sensor within automobile 400. Additionally, the 3D imaging system determines free space location 406, which lies on line-of-sight 402. The 3D surface point 410 and free space location 406 are then stored in memory, preferably in one of the configurations described herein. For example, 3D surface point 410 may be stored in an object database and the free space location may be stored in a free space database. Alternatively, they may be stored in a single database.

Figure 4A:
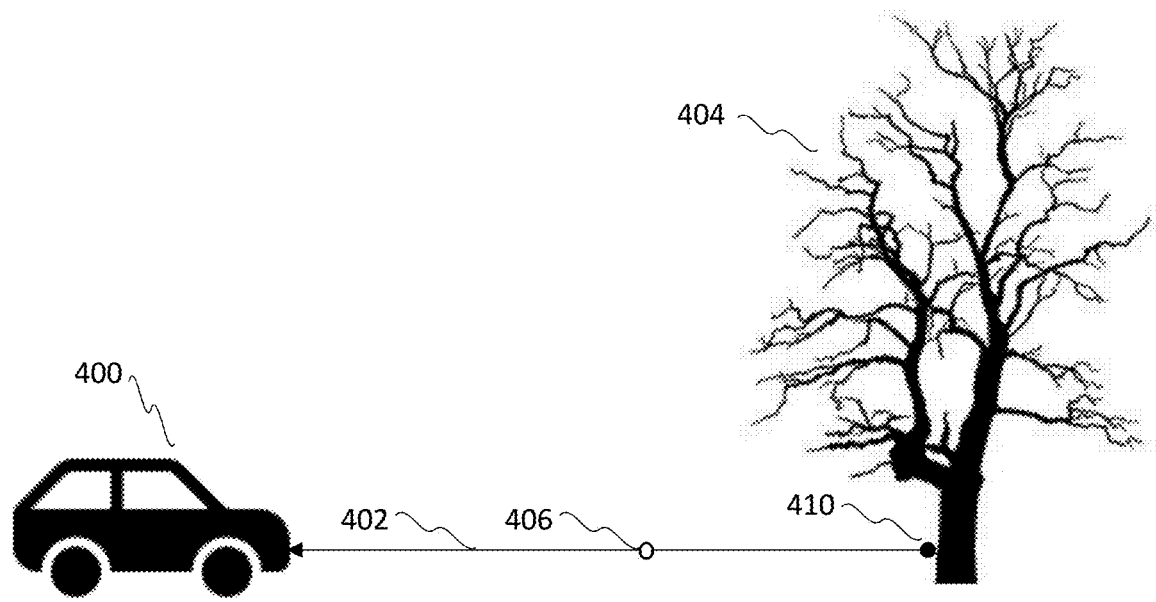
FIGS. 4A through 4D illustrate the operation of one embodiment of the invention in a non-static environment.
Figure 4B:
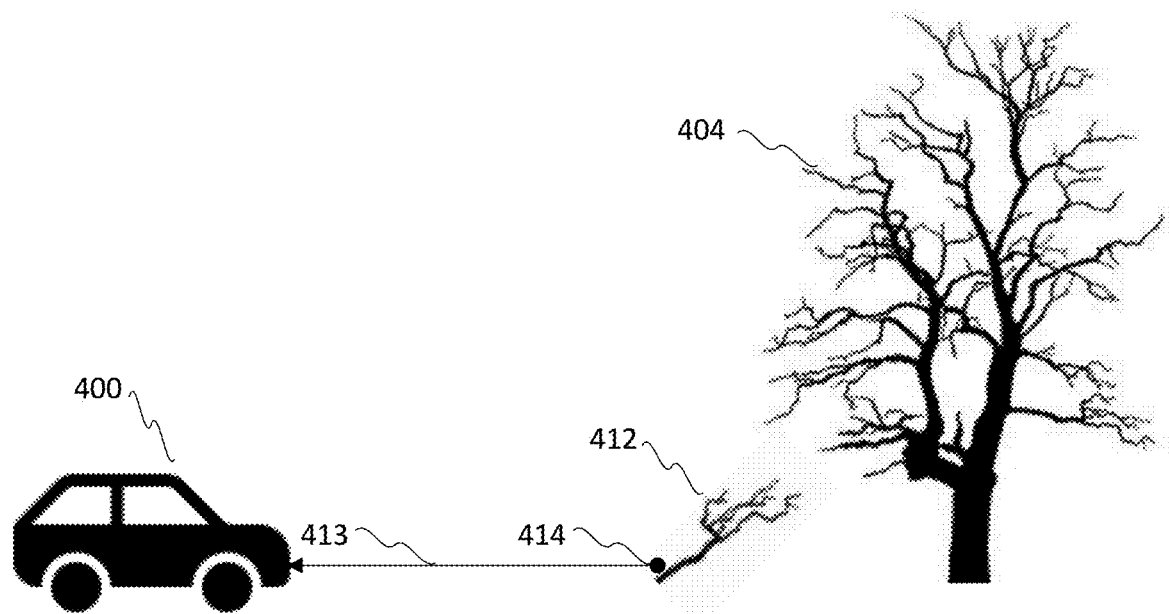

In FIG. 4B branch 412 has fallen along the path of automobile 400. The sensor within automobile 400 has detected surface point 414 reflecting from branch 412. Additionally, the 3D imaging system in automobile 400 determines line of sight 413 based on 3D surface point 414. When the 3D imaging system determines that surface point 414 is effectively the same as free space location 406 (from FIG. 4A) it creates an intrusion event. This intrusion event may result in additional response within automobile 400 including change of speed or direction or notification to the driver or vehicle control system.

Figure 4C:
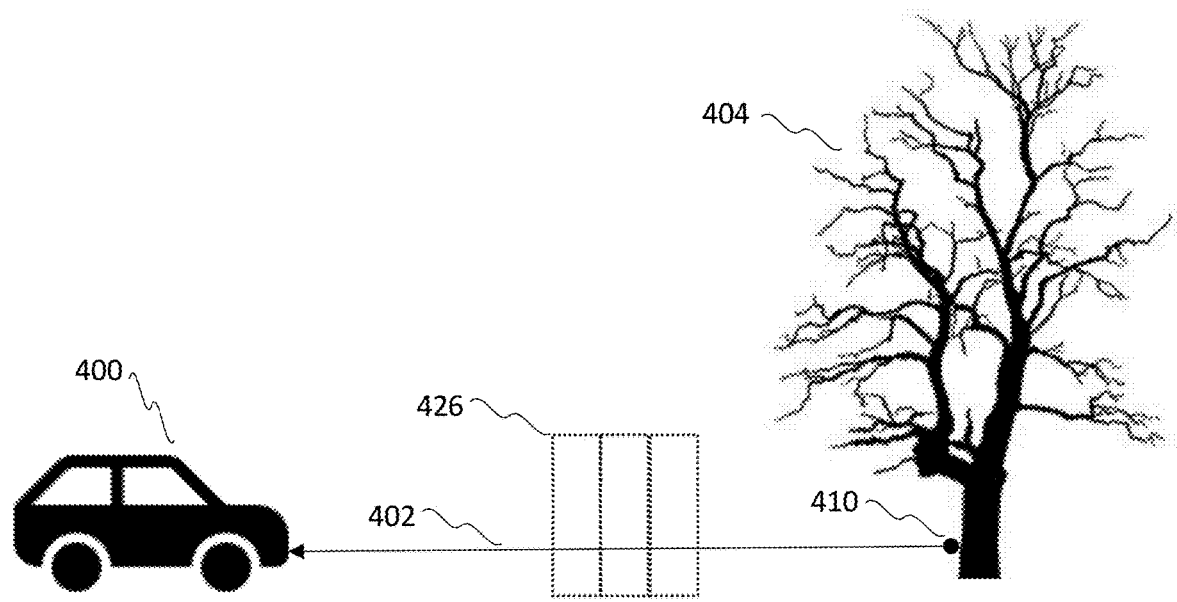

FIG. 4C illustrates the operation of another embodiment of the invention. In this embodiment the 3D imaging system is also located in automobile 400. The 3D surface point 410 is received by the 3D imaging system and line of sight 402 is calculated in response. In this embodiment, free space voxels 426 are then calculated based on the line of sight 402. As shown, free space voxels 426 are rectangular prisms that run from the surface of the road to just above the height of vehicle 400. Free space voxels 426 are preferably placed in the path of automobile 400.

Figure 4D:
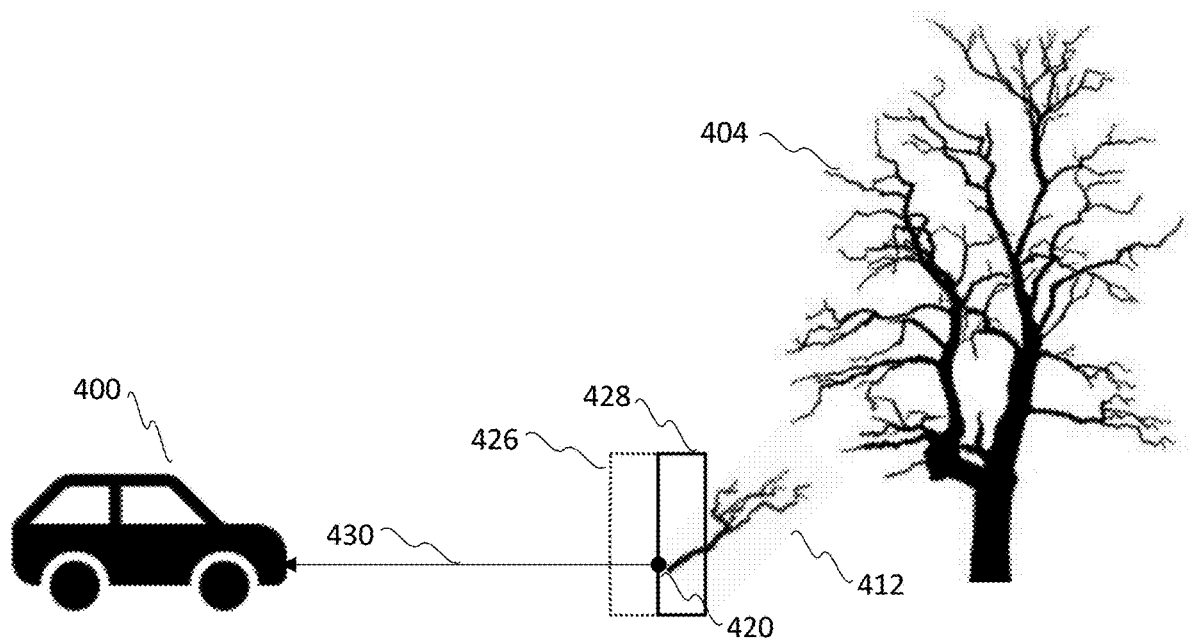

Referring now to FIG. 4D, when an object such as branch 412 falls in the path of automobile 400 a new 3D surface point 420 is received. In response a new line of sight 430 is calculated and occupied voxel 428 is created. The occupied voxel 428 is preferably a rectangular prism that runs from the surface of the road to just above the height of vehicle 400, similar to a free space voxel 426. Occupied voxel 428 may occupy an equivalent space as a free space voxel 426, or it may occupy a smaller, larger or partially overlapping space.

Giving free space voxels 426 and occupied voxels 428 a vertical span from the road surface to the height of automobile 400 both simplifies the processing required of the 3D imaging system and increases the quality of the monitoring in zones of particular importance. For example, it allows the 3D imaging system to focus on a smaller set of voxels that are only located within a zone of interest, thereby simplifying the processing required to detect an obstacle or intrusion. In one embodiment, when a new 3D surface point is located in a free space voxel 426 the entire free space voxel may be updated to an occupied voxel. This eliminates the need to process the many other points within that voxel. Alternatively, a new occupied voxel 428 may be created that occupied a large portion of a free space voxel 426. The ability to transform entire volumes from "free space" to "occupied" increases the speed and ease with obstacles on the horizon can be identified, tracked and avoided.

Additionally, by keeping the voxel height near the height of automobile 400, any 3D surface points above that height can be processed with less frequency. This is reasonable as there is less danger that surfaces or object above the maximum height of automobile 400 will collide with the moving automobile. While occupied voxels 428 and free space voxels 426 are described as rectangular prisms, other shapes are consistent with alternative embodiments of the invention including hexagon or triangle prisms, cubes, or cylinders.

In an alternative embodiment of the invention the 3D data may be encoded using octrees (also known as octa trees). Octrees make it easier to access only the 3D points necessary to create the surface of an occupied space, and therefore would be beneficial to the performance and operation of some embodiments of the 3D imaging system described herein. The use of octrees is known in the field of video games and graphics rendering, and its application to the storage of data for 3D imaging will improve the performance of that 3D imagine system including improved memory access and storage performance.

An octree is divided into eight octants. The nodes in point region octrees stores a 3D point that is the center of the subdivision for that node. The point is the corner for each of the eight children for that node. In a matrix based octree the point is at the center of the node space. Depth-first searches can be performed by only viewing the required surfaces.

It should be noted that various methods of performing the calculation, or determination, of a line-of-sight from a 3D surface point to a sensor or receptor will be well known to those skilled in the art. For example, a true Euclidian style geometric calculation may be performed to determine the location of one or more free space points along the line of sight. Alternatively, a database or lookup-table may be employed in order to determine one or more free space locations along a line of sight to a surface point.

In one embodiment of the invention the 3D information is stored is cartesian style 3D coordinates such as conventional x, y, z coordinates. This would typically include both the 3D points and the free space locations. Lines of sight determinations and other processing are performed accordingly. In an alternative embodiment of the invention, method of storing free space points, and calculating line of sights, employs the use of a polar coordinate style database that tracks the closest 3D surface point (or furthest free space point) in a set of directions defined by a 3D angle or set of angles. In this configuration, a 3D surface point from a 3D point cloud is placed into polar coordinate form, and the 3D angle is used to perform a look-up in the free space database. The free space database will return the distance of the furthest free space point and if that distance of the 3D surface point is more or less than the entry in the database, the entry for that 3D angle is updated with the newer distance. In this way, entire sets of free space points may be added or removed with a single database edit.

Those skilled in the art will recognize many other ways to calculate or determine a line of sight as well as points along that line of sight. The use of the alternative ways to perform such a determination are generally consistent with the use of one or more embodiments of the invention.

Figure 5:
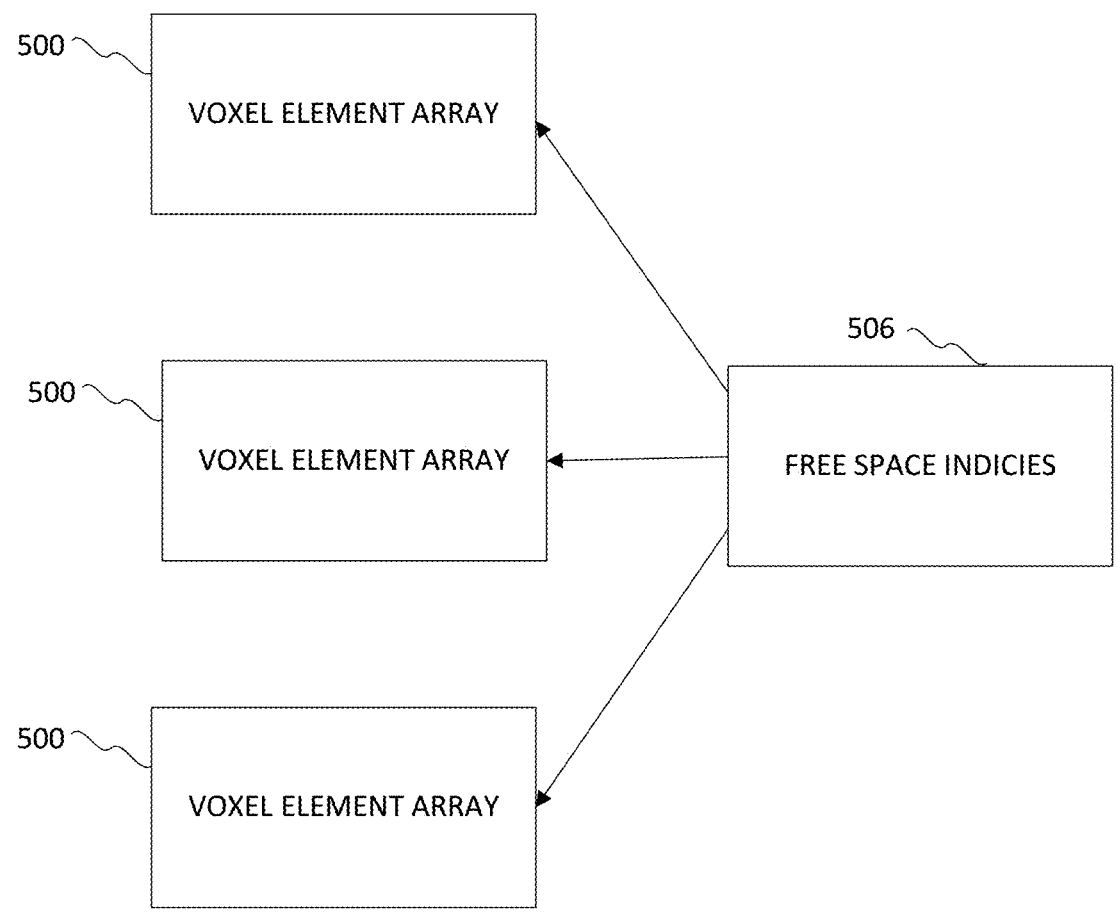
FIG. 5 shows a preferred method for storing free voxels in accordance with one embodiment of the invention.

FIG. 5 shows a preferred method for storing free voxels in accordance with one embodiment of the invention. Free space locations (or voxels) could be stored in memory unit 100 of FIG. 1 in this configuration. Still referring to FIG. 5, in this embodiment the voxels are organized in memory as a combination of lists and arrays. In particular, the voxels are first organized as plurality of voxel element arrays 500 of memory locations. These voxel element arrays 500 are then associated with a set of free space indices 506 whereby indices identify corresponding memory locations in each array.

The free space indices are preferably stored in rapid access memory such as static ram or registers. This allows large section of free space to be determined quickly via ranging and therefore limits the required direct memory accessing. If a voxel in a free space voxel element array become occupied motion will be detected and the 3D image database adjusted. Any required or necessary action, such as changing speed, direction or orientation, can then be performed by the 3D imaging system.

One exemplary embodiment of the invention incorporates a Lidar sensor 110 into a moving vehicle. The 3D imaging system acquires a succession of frames from different viewpoints. For example, a registration method for merging point cloud data from multiple viewpoints can then be used. This leverages geometric transformation to register the point cloud. This technique is part of the general category of simultaneous localization and mapping (SLAM) algorithms.

The 3D imaging system may construct a 3D reference map using the registration of successive frames from a 3D scanner. The pose and position information of the 3D imaging system is retrieved from direct measurement (IMU, GPS or other system) or derived from the acquired data from sensor 108. The derivation can be performed using SLAM calculations for instance. This information is used to construct a 3D model with both a surface information formed by point cloud data and free space information This information is integrated over time and over multiple frames.

In still another embodiment of the invention, 3D data is captured from multiple frames received in the past and aggregated. During this aggregation non-moving points and free space information are selected, which increases the spatial resolution in 3D of the 3D imaging system. More specifically, point cloud data from multiple frames can be projected into a single map ("rolling map" or "reference map").

Thus, a system and method for performing 3D imaging using free space information has been described. While the invention has been set forth in the context of various embodiments, it should be understood that these embodiments do not limit the scope or breadth of the invention. Rather, the scope and breadth of the invention (or inventions) described herein is set forth more particularly in the claims provided herein or ultimately set forth in any final issued patent or patents.

The invention claimed is:

1. A movement detection method comprising:
receiving a first 3D point corresponding to a detection by a first 3D sensor of a first occupied location at a first time of detection in a physical space;
receiving a second 3D point corresponding to a detection of a second occupied location at a second time of detection, the first time of detection being different from the second time of detection;
determining a third 3D point in a line-of-sight between the first 3D sensor at the first time of detection and the first 3D point;
detecting a movement at the third 3D point if said second 3D point and said third 3D point have functionally equivalent 3D coordinates.

2. The method of claim 1 wherein the second time of detection is after the first time of detection and wherein the movement is associated with an intrusion.

3. The method of claim 1 wherein said second 3D point is mapped onto a first voxel and said third 3D point is mapped onto a second voxel and said movement is detected with said first voxel equals said second voxel.

4. The method as set forth in claim 3 wherein a shape of said first voxel may be any one of the following shapes:
sphere;
cube;
cylinder;
prism; or
pyramid.

5. The method as set forth in claim 3 wherein said voxel is one of a set of prism shaped voxels, said prism shaped voxels having a height that runs from a road surface to a height of a vehicle.

6. The method as set forth in claim 5 wherein said set of prism shaped voxels are located in a direction of motion of said vehicle.

7. The method of claim 3 wherein said first voxel and said second voxel are part of a voxelized space, said voxelized space being defined by a grid having lines and columns.

8. The method of claim 3 wherein said first voxel and said second voxel are part of a voxelized space, said voxelized space being defined by a grid having lines, columns and rows.

9. The method as set forth in claim 1 wherein said third 3D point has a free probability, wherein said free probability is indicative of the probability of said third 3D point being unoccupied.

10. The method as set forth in claim 1 wherein said first 3D point has an occupied probability, wherein said occupied probability is indicative of the probability of said first 3D point being occupied.

11. The method as set forth in claim 1 wherein
i. said first 3D point has an occupied probability indicative of the probability of said first 3D point being occupied;
ii. said third 3D point has a free probability indicative of the probability of said third 3D point being unoccupied; and
movement is detected if said third 3D point and the first 3D point have functionally equivalent 3D coordinates and a net probability exceeds a predetermined threshold, wherein said net probability is calculated using said occupied probability and said free probability.

12. The method as set forth in claim 11 further comprising the step of:
adjusting said predetermined threshold in response to a change in a desired sensitivity.

13. The method of claim 1 further comprising the step of: activating a safety routine for an automobile in response to said intrusion.

14. The method of claim 1 further comprising the step of: sending an alert message in response to said intrusion.

15. The method of claim 1 further comprising the step of: changing the status of a parking slot from available to occupied in response to said intrusion.

16. A detection system comprising:
i. a 3D sensor for scanning a physical environment and for generating 3D points corresponding to physical surfaces in said physical environment;
ii. one or more non-transitory computer readable media storing instructions to:
generate free space points using a first receiver location from said 3D sensor and a 3D point from said 3D points;
store said 3D points and said free space points;
generate an intrusion event when 3D coordinates for a 3D point corresponds to 3D coordinates for a free space point, wherein said free space points are generated by determining a set of points along a line-of-sight between said 3D point and said first receiver location.

17. The system of claim 16 wherein said 3D sensor includes a LIDAR system.

18. The system of claim 16 wherein said 3D sensor is a sensor array that determines distance based on triangulation of the images received by two or more sensors from said sensor array.

19. The system of claim 16 further comprising the step of: activating a safety routine in response to said intrusion event.

20. The system of claim 16 wherein said free space points and said 3D points are mapped to voxels defined by a voxel grid.

21. A method for performing movement detection comprising the steps of:
b) receiving first 3D point cloud data from one or more 3D sensors, said first 3D point cloud data having 3D points corresponding to occupied space locations in a physical space;
c) calculating a line of sight between a first 3D point from said first 3D point cloud data and a position of a sensor from said one or more 3D sensors;
d) determining a freespace 3D point that falls along said line of sight;
e) receiving second 3D point cloud data from said one or more 3D sensors;
f) determining a new occupied 3D point from said second 3D point cloud data;
g) determining that said new occupied 3D point is equivalent to said freespace 3D point;
h) detecting movement in response to step f).

22. The method for performing movement detection as set forth in claim 21 wherein said freespace 3D point is mapped to a voxel.

23. The method for performing movement detection as set forth in claim 21 wherein said freespace 3D point is mapped to a first voxel and said new occupied 3D point is mapped to a second voxel, and step f) is performed by determining if said first voxel is equal to said second voxel.

24. The method for performing movement detection as set forth in claim 22 wherein step c) is performed by generating multiple prism shaped voxels that run from a road surface to a height that is at least as high as that of an associated vehicle.

25. The method for performing movement detection as set forth in claim 24 wherein said multiple prism shaped voxels are located in a direction of movement of said vehicle.

* * * * *